US005724415A

United States Patent [19]

Mills et al.

[11] Patent Number: 5,724,415

[45] Date of Patent: Mar. 3, 1998

[54] COIN DEFLECTOR FOR A COIN TELEPHONE RECEPTACLE

[75] Inventors: Woodrow W. Mills, Hoover, Ala.; Marcia Waryjas, Pembroke Pines, Fla.; Denise T. Quarles, Birmingham, Ala.

[73] Assignee: BellSouth Corporation, Atlanta, Ga.

[21] Appl. No.: 497,426

[22] Filed: Jun. 30, 1995

[51] Int. Cl.[6] ......................... H04M 17/00; B65D 91/00; G07F 1/04

[52] U.S. Cl. ......................... 379/150; 379/147; 232/43.3; 154/310; 154/344

[58] Field of Search ............................ 379/143, 145–155; 194/1 D, 310, 344, 350; 232/7, 8, 12, 14, 15, 16, 43.3, 55; 446/8, 10–14

[56] References Cited

U.S. PATENT DOCUMENTS

| | | | |
|---|---|---|---|
| 1,129,552 | 2/1915 | Cook . | |
| 2,990,113 | 6/1961 | Fosbrink et al. | 232/7 |
| 3,023,275 | 2/1962 | Hall et al. | 179/6.5 |
| 3,204,867 | 9/1965 | Wahlbom | 232/43.3 |
| 3,215,239 | 11/1965 | Denzer | 194/1 |
| 3,842,210 | 10/1974 | Dawson | 179/6.3 |
| 3,868,483 | 2/1975 | Trimmer et al. | 179/146 |
| 4,787,873 | 11/1988 | Borrmann et al. | 446/8 |
| 4,841,563 | 6/1989 | Sano et al. | 379/150 |
| 4,928,299 | 5/1990 | Tansky et al. | 379/37 |
| 5,027,390 | 6/1991 | Hughes | 379/150 |
| 5,054,056 | 10/1991 | Blythe | 379/145 |
| 5,058,966 | 10/1991 | McGough | 312/319 |
| 5,272,747 | 12/1993 | Meads | 379/59 |

FOREIGN PATENT DOCUMENTS

| | | |
|---|---|---|
| 31 34 178 | 3/1983 | Germany . |
| 5-166043 | 7/1993 | Japan . |
| 176 094 | 2/1922 | United Kingdom . |
| 338 164 | 11/1930 | United Kingdom . |
| 447 296 | 5/1936 | United Kingdom . |
| 499 654 | 1/1939 | United Kingdom . |

*Primary Examiner*—Curtis Kuntz
*Assistant Examiner*—Paul Loomis
*Attorney, Agent, or Firm*—Jones & Askew, LLP

[57] ABSTRACT

A coin receptacle which maximizes use of the space within the receptacle and minimizes the frequency of collection visits. The coin receptacle solves the problem of pyramiding and dead space within by providing a resilient, angled surface positioned in the path of the failing coins. Upon striking the resilient surface, the coins tend to spin or rotate and land flat, and are distributed throughout the receptacle. The structure minimizes the possibility of down time.

13 Claims, 2 Drawing Sheets

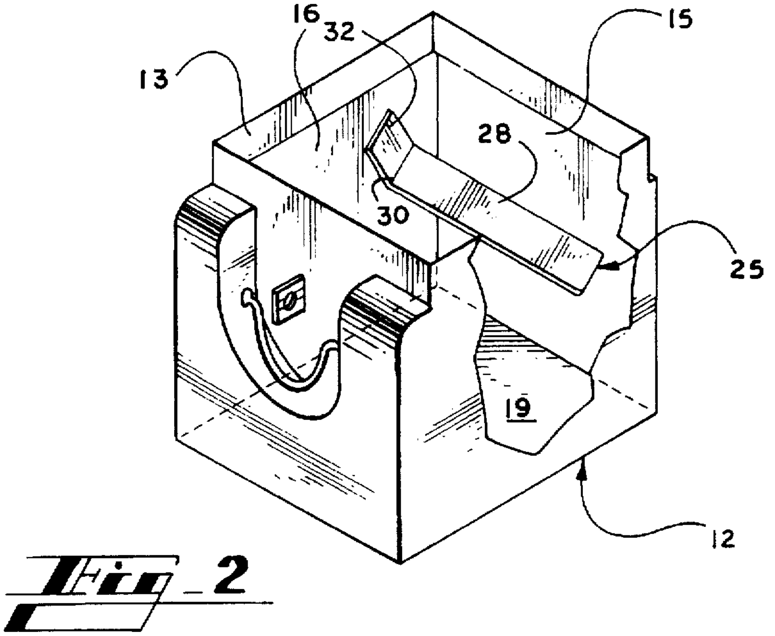
Fig_2
Fig_3
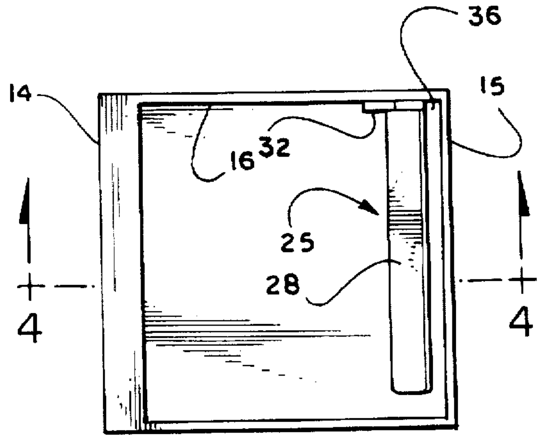
Fig_4
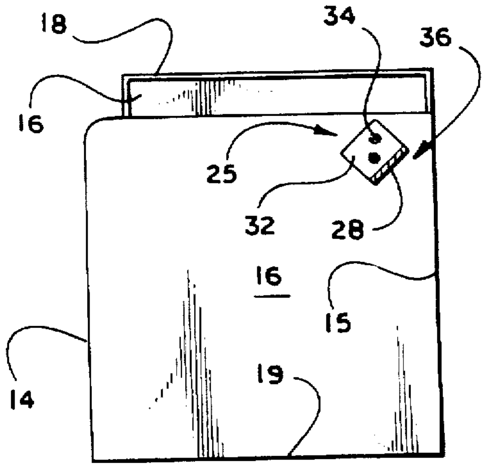

COIN DEFLECTOR FOR A COIN TELEPHONE RECEPTACLE

TECHNICAL FIELD

The present invention relates to a coin deflector for coin receptacles associated with coin operated devices such as coin telephones.

BACKGROUND OF RELATED ART

Coin operated devices, such as coin telephones, must include a receptacle for collecting coins deposited in the device over multiple uses of the device. Typically, the coin receptacle is removed from the device at periodic intervals by service personnel and replaced by an empty receptacle. Considerable labor cost is associated with collection visits, so it is desirable for the coin receptacles to have a large capacity, and to utilize all of the capacity of the receptacle to maximize the time between collection visits. However, if the receptacle becomes full, the device will become inoperative until the next collection visit, resulting in lost revenues.

When coins drop one-by-one directly into a receptacle, they tend to form a pyramid. The coins tend to stack up on edge and build up toward the coin receiving and validating mechanism. This often causes the coin operated device to go out of service when there is still up to thirty per cent vacant space in the coin receptacle. As a result, costly collection visits must be scheduled more frequently to avoid losing revenue as a result of devices such as coin telephones going out of service because of jammed coins. In conventional coin telephones, coins drop from a relay mechanism into a receptacle near the back of the receptacle. They tend to pyramid near the back of the receptacle until they block a chute which leads from the relay. Finally, the coins are unable to enter the chute and the telephone shuts down.

Minimizing dead space in coin receptacles has been a significant problem. Attempts have been made to prevent pyramiding of coins by deflecting the falling coins with an angled surface, and by placing a shelf in a corner near the top of the receptacle. However, these attempts have failed to solve the dead space problem adequately. Thus, there has long been a need in the art for a more effective way to distribute falling coins within a coin receptacle in manner which maximizes use of the space within the receptacle and minimizes the frequency of collection visits.

SUMMARY OF THE INVENTION

The present invention solves the problem of pyramiding and dead space within coin receptacles by providing a resilient, angled surface positioned in the path of the falling coins. Upon striking the resilient surface, the coins tend to spin or rotate and land flat, and are distributed throughout the receptacle. Dead space is significantly reduced, maximizing the interval between collection visits and minimizing the possibility of down time.

Generally described, the present invention provides a coin deflector for a coin receptacle that receives falling coins, comprising a resilient, angled surface positioned in the path of the falling coins and spaced above a bottom of the receptacle. Preferably, the resilient, angled surface comprises a strip of resilient material, such as spring steel, attached at one end thereof to a side wall of the receptacle, and defining a free end opposite the attached end. The resilience of the material preferably is selected along with the distance the coins fall before sting the deflector, to impart a bounce to the coins. The angle of the deflector preferably is about 45°.

The present invention also provides a coin telephone comprising a coin receptacle positioned to receive failing coins inserted into the telephone; and a coin deflector positioned in the path of the falling coins and spaced above a bottom of the receptacle, the deflector comprising a resilient, angled surface.

The present invention also provides a method of distributing falling coins within a receptacle, comprising the steps of resiliently imparting rotation and lateral movement to the falling coins by contacting the coins with a resilient, angled surface positioned in the path of the coins. Preferably, the step of resiliently imparting rotation and lateral movement to the falling coins further comprises bouncing at least a portion of the coins to areas of the receptacle that are relatively distant from their entry location. The coins are distributed substantially evenly over a horizontal cross section of the receptacle.

In a conventional coin telephone, an apparatus according to the present invention bounces coins from a rear entry point toward the front of the coin receptacle. This prevents the coins from pyramiding at the back part of the receptacle. The coins tend to fill the front portion of the receptacle first, and then slide toward the rear until the receptacle is substantially evenly filled.

Those skilled in the art will appreciate that the present invention can be utilized in various types of coin operated devices in addition to coin telephones. Such devices may include, without limitation, vending machines and coin operated games.

Therefore an important object of the present invention is to provide a method and apparatus for minimizing dead space within a coin receptacle.

It is a further object of the present invention to prevent pyramiding of coins within a coin receptacle.

It is a further object of the present invention to distribute coins evenly within a coin receptacle.

It is a further object of the present invention to prevent coin jams which take coin operated devices out of service.

It is a further object of the present invention to maximize the interval between collection visits to replace coin receptacles of coin operated devices such as coin telephones.

It is a further object of the present invention to provide an improved coin telephone and coin receptacle associated therewith.

Other objects, features and advantages of the present invention will become apparent upon examining the following description of the preferred embodiment of the invention, when taken in conjunction with the accompanying drawings and the appended claims.

BRIEF DESCRIPTION OF THE DRAWINGS

FIG. 2 is a more detailed pictorial view of the coin receptacle of FIG. 1.

FIG. 3 is a top view of the coin receptacle of FIG. 2.

FIG. 4 is a side cross sectional view taken along line 4—4 of FIG. 2.

DETAILED DESCRIPTION OF THE INVENTION

Figure 1:
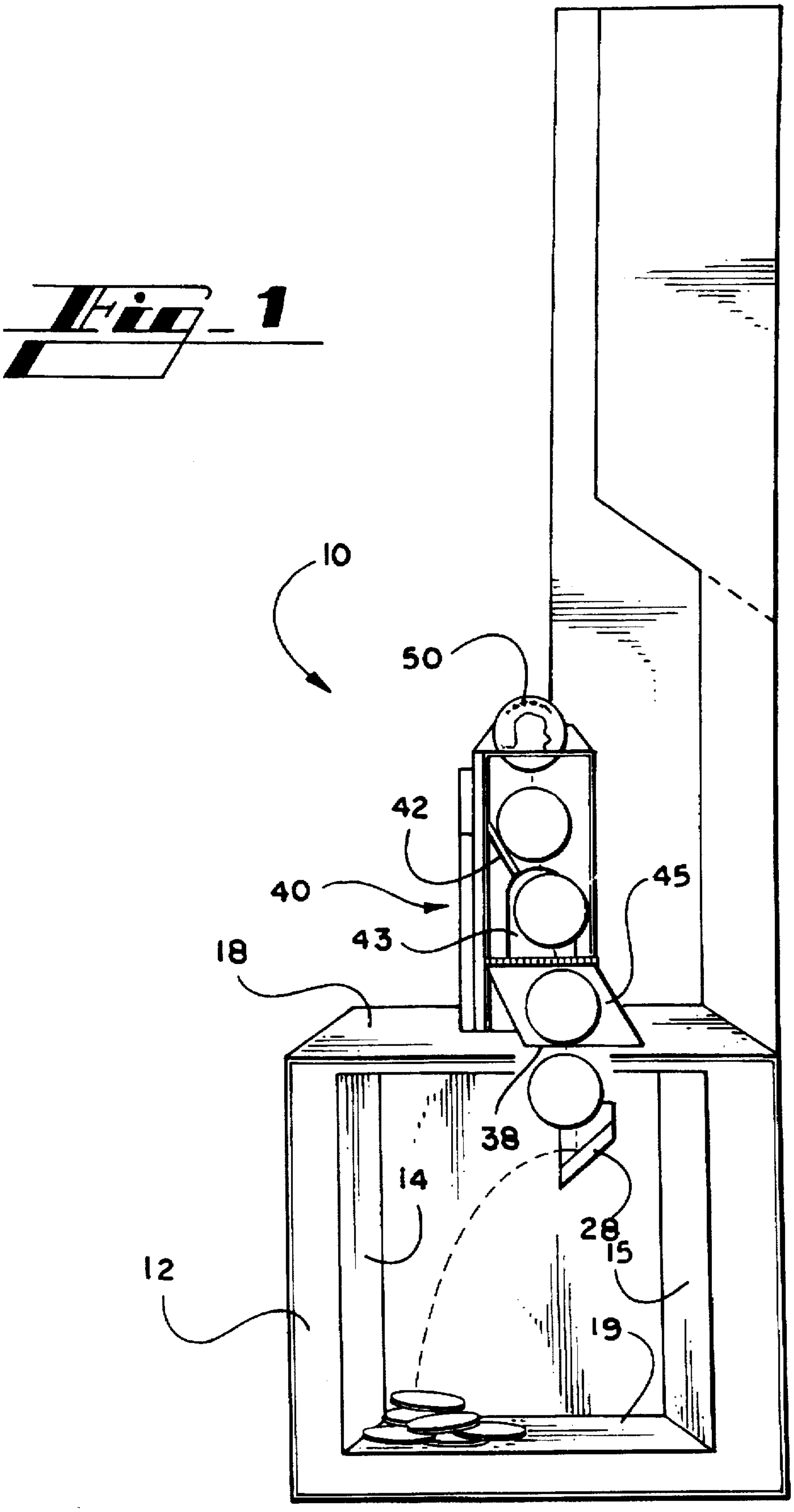
FIG. 1 is a diagrammatic pictorial view of a coin receptacle positioned below a relay mechanism of a coin telephone.

Referring now to the drawings, in which like numerals refer to like parts throughout the several views, FIG. 1 shows diagrammatically parts of a coin telephone 10, which includes a coin receptacle 12 embodying the present invention, shown in more detail in FIG. 2. The receptacle 12 is a rectangular box of conventional shape designed to slide into position within the telephone 10 and to be easily removed in a known manner for secure transfer of the coins collected in the receptacle. The receptacle includes a square upstanding collar 13 defining a top opening over which fits a cover 18, shown in FIG. 3. The cover defines an opening for permitting coins to fall into the receptacle. The receptacle 12 includes a plurality of side walls, including a front wall 14, a back wall 15, and a side wall 16. The side walls form vertical corners. A bottom wall 19 opposite the opening defined by the collar 13 connects the side walls.

A coin deflector 25 is positioned within the receptacle 12. The deflector 25 comprises a piece of resilient material bent to form an elongate deflector strip 28 separated from an attachment plate 32 by a right angle bend 30. The attachment plate 32 is secured, such as at spot welds 34, to the side wall 16 near the corner formed with the back wall 15. The plate 32 is attached at an angle to dispose the deflector strip 28 at an angle of about 45° with respect to the horizontal when the receptacle 12 is installed in a coin telephone. Normally, the receptacle is installed with the bottom 19 oriented horizontally, so that the strip 28 forms an angle of about 45° with the bottom surface 19.

The coin deflector 25 preferably is made of spring steel (such as "RD Banding Steel") having a tensile strength of about 1225 pounds, a thickness of about 0.020 inch, a width sufficient to intercept essentially all the coins, (about ⅜ to about ¾ inch), and a length sufficient to provide sufficient springiness and to intercept essentially all coins that fall into the receptacle. The vertical position of the plate 32 should be high enough to allow the receptacle to be filled substantially, and low enough so that the coins fill far enough to pick up sufficient speed to bounce, preferably about 2 to about 2½ inches below the height at which the coins are released. The strip preferably extends parallel to the back wall 15 separated from the wall by a gap 36 of about ⅛ inch to about ⅜ inch. The gap should be narrow enough to assure that coins do not often slip between the strip and the back wall. In a still more preferred embodiment, the width of the strip 25 is ½ inch, the length is 3½ inches, the gap 36 is ¼ inch, and the distance from coin release is 2¼ inches.

Those skilled in the art will appreciate that all of the above parameters may be varied relative to one another while accomplishing the function of the present invention. Thus, the resilient strip may be made of any material capable of providing a resilient surface. The term "resilient surface" as used herein means a surface which moves under the impact of a filling coin and springs back to impart energy to the coin, as opposed to a relatively rigid surface which essentially only deflects the coin's path. As noted above, the purpose of using an angled, resilient surface as a deflector is to impart spin or rotation to the coins, which then tend to lie flat, and to impart lateral motion to the coins sufficient so that they tend to be distributed throughout the receptacle. Various resilient materials could be used for the deflector strip 28, such as metal, plastic, or other synthetic materials. The degree of resilience may be less if the coins are filling from a greater height, or if the coins are landing a greater distance from the attachment point of the strip. As an alternative to the strip shown having a free end, a more highly resilient material, such as rubber, could be attached to opposite side walls of the receptacle across the path of the coins in a manner providing a resilient surface.

Similarly, the strip may be raised to a shorter distance from the coin release point, or the length of the strip may be reduced, if the material's resilience imparts more force to the coin. The optimum position of the strip in the horizontal plane will vary depending on where above the receptacle the coins are released.

The coin receptacle 12 is positioned within the telephone 10 beneath an exit slot 38 formed in the structure of a relay mechanism 40 of the telephone. FIG. 1 shows several positions of a coin 50 as it makes its way through the relay mechanism 40. The weight of the coin must depress a tongue 42, allowing the coin to enter a chute 43. The coin then passes a diverter vane 45, which sends the coin either to the return chamber of the telephone (not shown) or to the receptacle 12. For coins directed to the receptacle, after the coins leave the diverter, they fall freely through the opening in the receptacle cover 18 until they strike the deflector strip 28, which is positioned in the path of the falling coins 50. The coins do not have a predictable orientation when they strike the strip 28. When a coin hits the strip 28, the strip bends under the impact, and springs back, imparting a force to the coin. The action of the strip tends to cause the coin to rotate, and also imparts lateral movement to the coin, as shown in FIG. 1. Following this interaction, the coin tends to find a resting place lying flat, and the coins as a group tend to be well-distributed throughout the cross section of the receptacle.

In a conventional coin telephone, the coins fall into the rear portion of the receptacle. Therefore, the strip 28 extends near the rear wall 15 as described above. The coins bounce toward the front wall 14, and the front portion of the receptacle fills first. Subsequently, coins bouncing off the strip and landing in the receptacle will tend to be directed rearwardly, so that the receptacle becomes substantially evenly filled. In contrast, coins falling directly to the bottom of a conventional coin telephone receptacle tend to pyramid at the rear of the receptacle until they block off entry for additional coins and disable the telephone before the receptacle is actually full. Prior attempts using a more rigid slanted surface have not solved the distribution problem.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

We claim:

1. A coin receiving device, comprising:

a coin receptacle that receives failing coins; and a flat, elongate strip of resilient material attached at one end thereof to a side wall of said receptacle, extending horizontally from said side wall under the path of said falling coins to a free end opposite said attached end, and being angled with respect to the path of said falling coins about a horizontal axis connecting said side wall and said free end of said strip;

said strip being angled about said horizontal axis so as to bounce falling coins generally parallel to said side wall, and said free end being sufficiently far from said side wall to resiliently cause said falling coins to bounce and rotate.

2. The coin receiving device of claim 1, wherein the angle of said strip about said horizontal axis is about 45° from the horizontal.

3. The coin receiving device of claim 1, wherein said strip has a length to width ratio of at least about 4.6:1.

4. The coin receiving device of claim 1, wherein said receptacle comprises a pair of side walls meeting at a corner, and wherein said strip of resilient material extends from one of said side walls along and spaced from but closely adjacent to the other of said side walls.

5. The coin receiving device of claim 4, wherein said strip has a width from about ⅜ inch to about ¾ inch.

6. The coin receiving device of claim 5, wherein said strip has a length of about 3.5 inches.

7. The coin receiving device of claim 1, wherein said strip extends substantially across said receptacle.

8. The coin receiving device of claim 1, wherein said coin receptacle (12) is connected to a coin telephone.

9. The coin receiving device of claim 1, wherein said resilient material is spring steel.

10. The coin receiving device of claim 1, wherein said strip is positioned at least about 2 inches below a point at which said coins begin free fall toward said receptacle.

11. A method of distributing coins in a coin receiving device, including the steps of:

dropping coins into a coin receptacle onto a flat, elongate strip of resilient material attached at one end thereof to a side wall of said receptacle, said strip extending from said side wall to a free end opposite said attached end, and being angled at about 45° from the horizontal about a horizontal axis connecting said side wall and said free end of said strip; and bouncing said falling coins from said strip in a direction generally parallel to said side wall;

said free end being sufficiently far from said side wall to resiliently cause said falling coins to bounce and rotate.

12. The method of claim 11, wherein said step of deflecting said falling coins comprises bouncing at least a portion of said coins off side walls of said receptacle.

13. The method of claim 12, wherein said step of deflecting said falling coins comprises distributing said coins substantially evenly over a bottom of said receptacle.

* * * * *